March 21, 1961 L. M. BARTON 2,976,363
MODULATION OF SELECTED PHASES OF CARRIERS FOR
SIMULTANEOUS TRANSMISSION THROUGH
SINGLE DELAY MEANS
Filed Dec. 30, 1957 2 Sheets-Sheet 1

INVENTOR:
LEON M. BARTON,
BY Michael Masnik
HIS ATTORNEY.

INVENTOR:
LEON M. BARTON,
BY Michael Masnik
HIS ATTORNEY.

United States Patent Office 2,976,363

Patented Mar. 21, 1961

2,976,363

MODULATION OF SELECTED PHASES OF CARRIERS FOR SIMULTANEOUS TRANSMISSION THROUGH SINGLE DELAY MEANS

Leon M. Barton, Syracuse, N.Y., assignor to General Electric Company, a corporation of New York Filed Dec. 30, 1957, Ser. No. 706,212

11 Claims. (Cl. 178—50)

My invention relates to signal processing, and particularly to a method and means for processing a plurality of independent signals in a common manner.

It is oftentimes desirable to process a plurality of independent signals in a common manner, as for example by delaying each signal simultaneously by the same amount of time. For example, where the three independent signals have a characteristic modulation and it is desired to preserve the modulation faithfully while introducing a precise time delay in each, difficulties arise where the time delay is large compared to the reciprocal of the modulation band width. For example, in certain applications it is desirable that a plurality of such signals undergo an equal time relay by passage through a time delay circuit which is made of materials, such as quartz, mercury, etc., which introduce a time delay. In the past it has been common to employ separate time delay circuits for each of the respective signals. Where the time delays are long, difficulties have been encountered in manufacturing uniform delay lines for providing an equal time delay. Furthermore, in operation, temperature effects operate to destroy whatever equality may have been initially manufactured into these devices. To compensate for all these departures from equality, use has been made of complicated control circuits for detecting and compensating for any variations in time delay between the various elements. The result has been cumbersome, complex, expensive apparatus which oftentimes fails to provide the desired results.

It is therefore an object of this invention to provide an improved signal processing arrangement and method.

It is another object of this invention to provide an improved method and means for time delaying simultaneously and by the same time period a plurality of independent signals each having a characteristic modulation.

It is a further object of this invention to provide an improved arrangement for distinguishing between moving and fixed targets in an object detection system of the pulse echo type.

It is a further object of this invention to provide an improved object detection display.

It is a further object of this invention to provide an improved multiplexing arrangement.

Briefly, in accordance with one embodiment of the present invention, it is desired to introduce a time delay into three independent electrical signals each undergoing a characteristic modulation. Use is made of a single delay line. The signals are superimposed on a supersonic carrier by a method of phase and frequency multiplexing. The superimposed signals are applied through the same delay line and then demultiplexed to yield the signals in their independent form but with the desired time delay.

Figure 3:
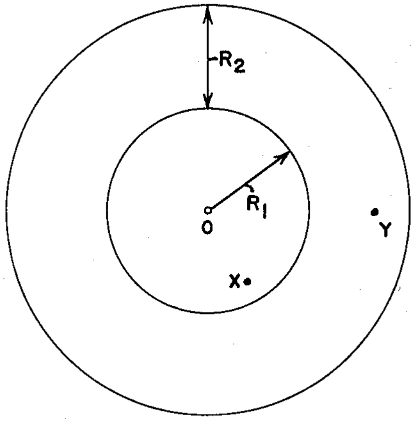
Figure 4:
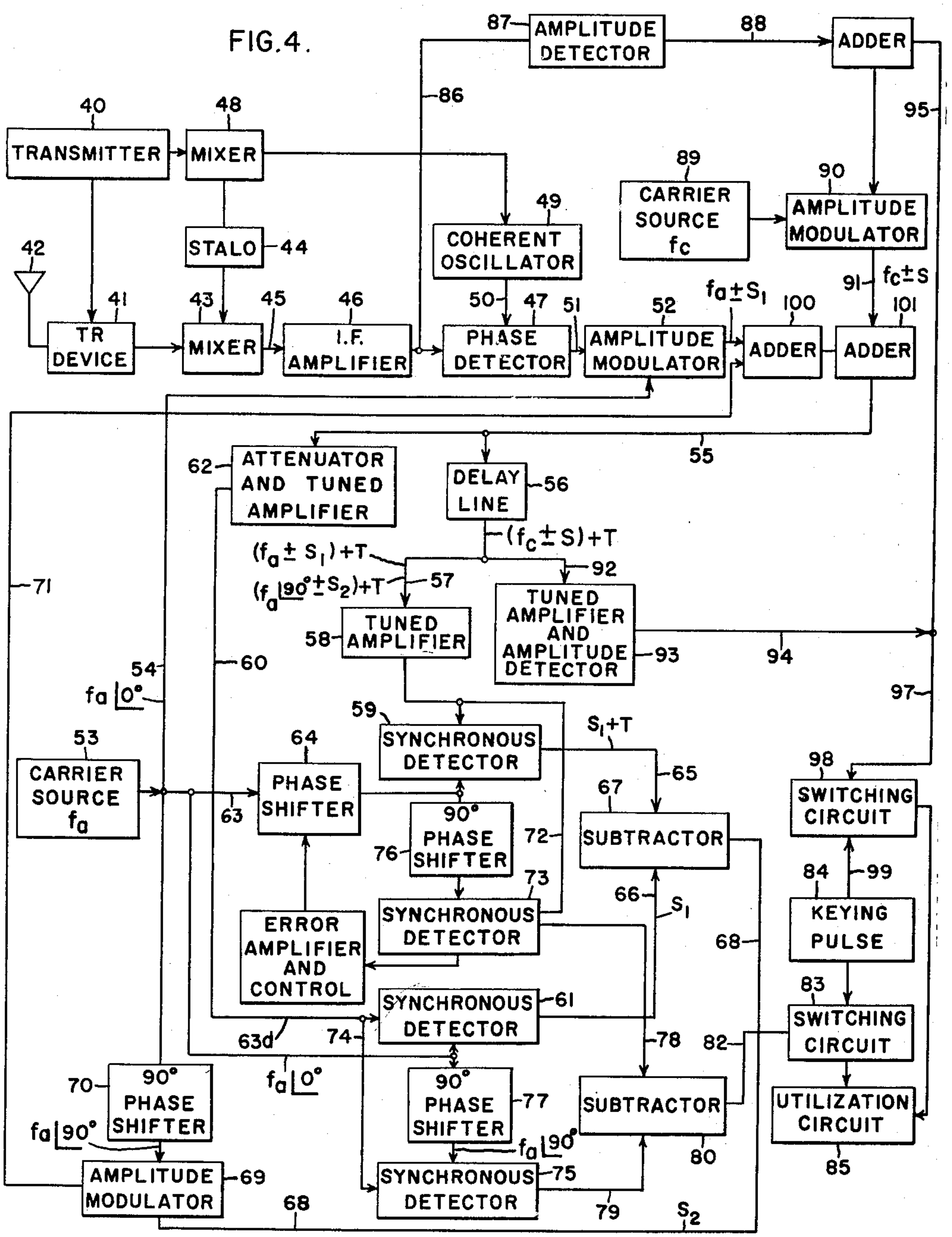

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings in which Fig. 1 illustrates schematically certain objects of the present invention and a prior art arrangement for accomplishing the same, Fig. 2 illustrates in block diagram form an embodiment of the present invention for processing a plurality of independent signals by a method of phase and frequency multiplexing, Fig. 3 illustrates schematically an information display useful in explaining a further embodiment of the invention, and Fig. 4 illustrates in block diagram form an embodiment of the invention for providing the display described in Fig. 3.

Figure 1:
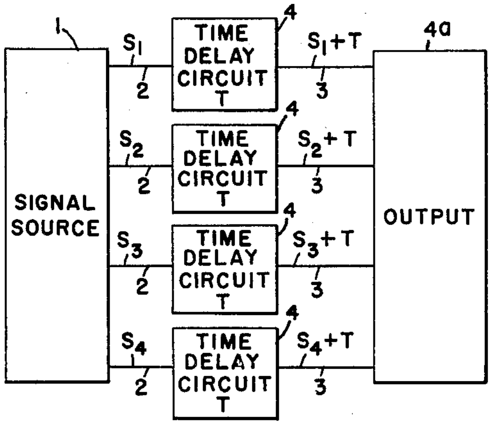
Figure 2:
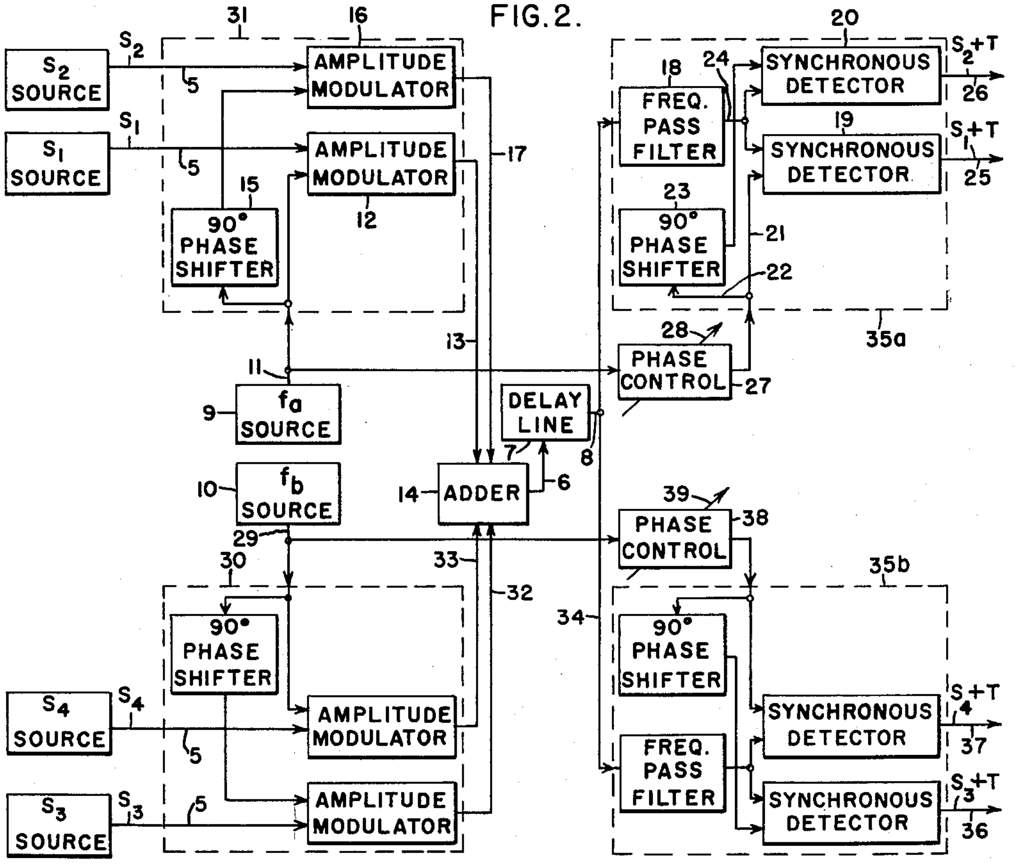

Referring to Fig. 1 there is shown a source 1 of a plurality of signals shown as $S_1$, $S_2$, $S_3$ and $S_4$ available on respective output leads 2. It is desired to provide these independently occurring signals, each having a characteristic modulation, on respective output leads 3 with an equal time delay T. To accomplish this there is provided a plurality of time delay circuits 4 which are responsive to a signal applied on a respective input lead 2 for supplying the same signal on an associated output lead 3 with a time delay T. The respective time delayed output signal $S_1+T$, $S_2+T$, $S_3+T$ and $S_4+T$ are applied to an output circuit *4a* where they are utilized.

As previously mentioned, use of a plurality of time delay circuits introduces certain problems and provides undesirable results. In accordance with one embodiment of the present invention, it is proposed that a single time delay circuit be employed for simultaneously time delaying each of a plurality of independent signals undergoing a characteristic modulation. Referring to Fig. 2 there is shown a plurality of signals $S_1$, $S_2$, $S_3$ and $S_4$ available on respective output leads 5. It is desired to apply all of these signals simultaneously over lead 6 to a common time delay circuit 7 for undergoing an equal time delay T, such that each of the signals appear on the output lead 8 with the same time delay T. In order to accomplish this, signals $S_1$ and $S_2$ are superimposed on a supersonic carrier signal of frequency $f_a$ available from source 9 by a process of phase multiplexing, and the phase multiplexed modulation components applied through the delay line 7. In a similar manner, signals $S_4$ and $S_3$ are superimposed upon a supersonic carrier signal of frequency $f_b$ available from source 10 by a process of phase multiplexing and the phase multiplexed modulation components applied over lead 6 to the common delay line 7.

Signal $S_1$, available on output lead 5, is applied together with a signal of frequency $f_a$, available on output lead 11 from source 9, is applied to an amplitude modulator 12 and the modulation product $f_a \pm S_1$ appears on the output lead 13. The modulation product is then applied to an adder circuit 14. Signals of frequency $f_a$ available on lead 11 are also applied to a phase shifter 15 where they undergo a phase shift of 90 electrical degrees with respect to the signals applied to amplitude modulator 12. The phase shifted carrier oscillations of frequency $f_a$ are applied to an amplitude modulator 16 where they are amplitude modulated by the signal $S_2$ and the resultant modulation product $f_a \angle 90° \pm S_2$ appears on output lead 17. The last-named modulation product is then applied to the adder 14 for addition with the modulation products available on lead 13. The added modulation products available on lead 6 are then applied through the same time delay line 7 and appear on the output lead 8 with the same time delay or $(f_a \angle 90° \pm S_2)+T$ and $(f_a \pm S_1)+T$. The time delayed phase multiplexed signals available on lead 8 are then applied through a frequency pass filter 18 to synchronous detectors 19 and 20. The frequency pass filter 18 operates to pass frequencies in a narrow band centered around the multiplexed modulation components of the carrier frequency $f_a$ available on lead 8, and to effectively block signals at a removed carrier frequency. The purpose of this will be described shortly. Carrier frequency oscillations of frequency $f_a$ available from source 9 are applied over lead 21 to the synchronous detector 19. Carrier frequency oscillations of frequency $f_a$ from source 9 are also applied over lead 22 to a phase shifter 23 for undergoing a 90 degree phase shift. The 90 degree phase shifted carrier oscillations from 23 are applied to the synchronous detector 20. The synchronous detector 19 is responsive to amplitude modulation of carrier oscillations on lead 24 which are in phase with the reference carrier oscillations available on lead 21 and effectively rejects those modulations which are in phase quadrature. Thus, the synchronous detector 19 yields at its output lead 25 signals $S_1+T$. Similarly, synchronous detector 20 is responsive to amplitude modulation of the carrier oscillations available on lead 24 which are in phase with the reference carrier oscillations available from the phase shifter 23, and effectively rejects those modulations which are in quadrature phase. Thus, synchronous detector 20 yields on its output lead 26 signals $S_2+T$. It should be noted that by the arrangement shown, common delay line 7 was employed to provide independent signals $S_1$ and $S_2$ at respective output leads 25 and 26 with the same time delay T. To compensate for any time delay changes introduced either by a change in the characteristic time delay circuit 7 or a variation in the phase or frequency of the oscillations available from source 9, a phase control circuit 27 is provided with a control 28 so that the reference oscillations directly applied from source 9 to the synchronous detectors 19 and 20 maintain a fixed phase relationship with respect to the phase of the modulated oscillations available on lead 24 from the delay line 7.

To accommodate two additional signals $S_3$ and $S_4$ available from respective sources on respective output leads 5, there is provided a further source of carrier oscillations $f_b$ available on lead 29 from source 10. The $S_4$ and $S_3$ signals and the oscillations $f_b$ are applied to an arrangement shown in dotted line form 30 which serves a function similar to that of block 31 employed to process the signals $S_1$ and $S_2$. The resultant signals, $S_4$ and $S_3$, after processing in block 30, appear on output lead 33 as $f_b \pm S_4$ and on lead 32 as $f_b\angle 90° \pm S_3$. After addition in adder 14 with the other modulation components available on leads 13 and 17, the added modulation products are applied to the common delay line 7 and appear at the output lead 8. Pass filter 18 operates to block modulation components of the carrier oscillations $f_b$ while passing those of frequency $f_a$. Thus, in the same manner, the modulation products of the carrier oscillation $f_b$ are applied over lead 34 to a block shown in dotted form and labeled 35*b*. Block 35*b* serves a similar function to that of block 35*a* associated with the signals $S_1$ and $S_2$. After passage through a similar frequency pass filter which is adapted to block modulation products of frequency $f_a$ but to pass modulation products of frequency $f_b$ the signals $(f_b \pm S_4)+T$ and $(f_b\angle 90° \pm S_3)+T$ are applied to respective synchronous detectors for phase comparison with signals of frequency $f_b$ and $f_b\angle 90°$ available from source 10. The result is that signal $S_4+T$ appears on the output lead 37 and $S_3+T$ appears on lead 36. A phase control circuit 38 with a control element 39 is provided to compensate for any relative time delay introduced either by a change in the characteristics of the time delay circuit 7 or the frequency of oscillation of signals available from source 10. Thus it is seen by a process of phase and frequency multiplexing a single time delay circuit 7 was employed to simultaneously time delay a plurality of independent signals, each having a characteristic modulation, by the same amount.

Referring to Fig. 3 there is shown an application of the present invention in the field of object detection of the pulse echo type. In object detection systems of the pulse echo type, a form of display commonly referred to as a plan position indicator display, PPI, is employed to show the location of radar objects with respect to a radar station. For example, if the radar station is represented as being located at point 0 on the face of a cathode ray tube arrangement, detected objects are shown at X and Y having a proper positional relationship with respect to the radar station 0. For example, the radial distance from 0 to X or to Y is an indication of range to these remote objects and the angular position of X and Y with respect to 0 would represent the azimuth direction to these objects. In one application, it is desired to remove stationary objects or ground clutter from the display in the circular region $OR_1$ and display only moving objects such as at X. It is also desirable to select a different range as for example that described by the annulus $R_2$ and to enhance the display of moving objects such as Y relative to that of stationary objects. The range defined by $R_2$ would normally be beyond the radar horizon so that essentially moving targets in enhanced form only would be displayed. To accomplish this, use has been made of double cancellation moving target indicator techniques and the process of integration. These, in turn, make use of a time delay line. As previously mentioned, it is desirable to employ a common delay line for certain purposes. Thus the present invention finds a direct application.

Referring to Fig. 4 there is shown in block diagram form a radar station comprising a transmitter 40 which generates high powered radar pulses for application over the TR device 41 to a directive radar antenna 42 for transmission to remote objects in space. The antenna 42 is adapted to scan a given field of view defined as for example by the PPI display of Fig. 3. Received echoes returned from remote objects are received in the antenna 42 and applied through the TR device 41 to mixer circuit 43. The TR device is well known in the art and adapts to pass high powered radar pulses directly to the antenna 42 while blocking them from application to the mixer 43 while permitting weak signals, corresponding to echoes returned from remote objects, to be applied to the mixer 43 and not to the transmitter 40. 44 comprises a source of stable local oscillations for mixing with the received echoes in mixer 43 to yield echoes at an intermediate frequency level on lead 45. The signals on lead 45 are amplified in amplifier 46 and applied to a phase detector 47. In the present instance it is assumed that the transmitter transmits high powered pulses at an RF level and random phase. To perform moving target cancellation it is necessary to establish coherence between the received echoes and the transmitted radar pulses. Thus a portion of the transmitted pulses is applied from the transmitter 40 to the mixer 48 for mixing with stable local oscillations from 44. The output signals from mixer 48 are applied to the coherent oscillator 49 for successively establishing the phase of the oscillations available from oscillator 49 on lead 50 to have the phase information of the transmitted pulses. The coherent oscillations available on lead 50 are applied to phase detector 47 for comparison with the echoes available from 46. The output of phase detector 47 comprises video frequency signals having an amplitude corresponding to the relative phase between the signals available on leads 50 and amplifier 46. The video signals or coherent echo signals available on lead 51 are applied to an amplitude modulator 52. In order to derive moving target information from the echoes at video level appearing on lead 51, it is necessary to compare the coherent video signals between interpulse periods. Since a single delay line is to be employed for purposes of extracting the MTI information, a first source of carrier oscillations at frequency $f_a$ is provided at 53. These carrier oscillations at frequency $f_a$ are applied over lead 54 to the amplitude modulator 52 for amplitude modulation by the video signals available over lead 51. For purposes of simplicity, the signals available at the output of the modulator 52 are referred to as having an in-phase modulation component. Thus the output signals from 52, $f_a \pm S_1$, are applied through two successive adder circuits 100 and 101 and appear on the output lead 55. The purpose of the adder circuits will be described shortly. The signals available on 55 are then applied through the delay line 56 and appear at the output lead 57 with a time delay T as $(f_a \pm S_1)+T$. The signals available on lead 57 are applied through a tuned amplifier 58 to the synchronous detector 59. Tuned amplifier 58 operates to exclude all carrier frequencies outside the $f_a$ frequency region. To perform the cancellation necessary to obtain moving target information, the signals available on lead 55 are also applied without delay over lead 60 to the synchronous detector 61 through the attenuator and tuned amplifier 62. The attenuator compensates for the loss of amplitude of the signal passed through the delay line 56. A portion of the carrier oscillations from source 53 are applied over lead 63 through the variable phase shifter 64 to synchronous detectors 59 and with the same relative phase over lead 63*a* to synchronous detector 61.

Synchronous detector 59 operates, as will be described shortly, to detect the in-phase component of the $f_a$ modulations and deliver on its output lead 65 signal $S_1+T$. Similarly, detector 61 provides on its output lead 66 the underlayed signal $S_1$. The signals available on leads 65 and 66 are subtracted in circuit 67 to yield on output lead 68 the first cancelled video echo signals. For purposes of simplicity, the signal available on lead 68 shall be called $S_2$. In order to permit use of the same delay line 56 for purposes of moving target information extraction, the signal $S_2$ is used to amplitude modulate in 69 the signals of frequency $f_a$ phase shifted 90 degrees. This phase shift is accomplished by passing the oscillations available from source 53 through a phase shifter 70 before application to the amplitude modulator 69. Thus the signal available on output lead 71 is $f_a\lfloor 90^\circ \pm S_2$. This signal is applied through the adder circuits 100 and 101 and appears at the output lead 55 together with the first cancelled modulation products of signals $S_1$. The modulated quadrature phase carrier oscillations available on lead 55 are applied through the delay line 56, the tuned amplifier 58 and over lead 72 to the synchronous detector 73 and tuned amplifier 62. Undelayed modulated quadrature phase carrier oscillations available on lead 55 are applied directly through the attenuator 62 and over lead 74 to the synchronous detector 75. Detectors 73 and 75 have applied to them carrier frequency oscillations of quadrature phase, $f_a\lfloor 90^\circ$, by operation of the phase shift circuits 76 and 77. Detectors 73 and 75 are responsive only to the quadrature phase carrier frequency oscillation components to yield at the output lead 78 signal $S_2+T$ and on lead 79 the signal $S_2$. The signals available at 78 and 79 are applied through the subtractor circuit 80 and appear on the output lead 82 as second cancelled video echoes. The double cancelled video echo signals are switched by means of switching circuit 83 under the control of keying pulses from 84 to the display of utilization circuit 85. In a particular application the keying pulses may be synchronized with the radar pulse transmission frequency to switch the double-cancelled video signals during a period corresponding to the range $OR_1$ shown in Fig. 3.

In order to permit echo signal integration with the same delay line 56, uncoherent echo signals at an intermediate frequency level available on lead 86 are applied through an amplitude detector 87 to provide echo signals S at a video level on lead 88. Video signals S are mixed with carrier frequency oscillations of frequency $f_c$, available from source 89, in the amplitude modulator 90 to yield on output lead 91 signals $f_c \pm S$. These signals are applied through the adder circuit 101, lead 55 and the delay line 56 to yield on output lead 92 signal $(f_c \pm S)+T$.

After filtering and detection in tuned amplier and amplitude detector 93, there appears on the output lead 94 the signal $S+T$. This signal is returned over lead 95 for further mixing in amplitude modulator 90 and further delay in circuit 56 so that an additive process results, with the result that on output lead 97 there appears integrated versions of the signal S. The integrated echoes, available at a video level on lead 97, are sequentially applied under control of keying pulses from source 84 available on lead 99 through switching circuit 98 to the display circuit 85. The keying pulses have a timing such that the integrated signals are applied to the display circuit 85 during the time interval corresponding to the period $R_2$ shown in Fig. 3.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a source of first signals, second signals, third signals and fourth signals, each having a characteristic modulation, a common time delay line, means for simultaneously time delaying said signals by the same amount comprising a source of first frequency oscillations having two components with a fixed, relative phase difference, a source of second frequency oscillations having two components with a fixed, relative phase difference, means for amplitude modulating each of said components with a respective one of said first, second, third or fourth signals, to provide amplitude modulated components, means for applying said amplitude modulated components through said delay line to provide time delayed modulated components, and means for demodulating said time delayed modulated components to provide time delayed first, second, third and fourth signals.

2. In combination, a source of first signals, second signals, third signals and fourth signals, each having a characteristic modulation, a common time delay line, means for simultaneously passing said signals through said delay line comprising a source of first frequency oscillations having an in-phase and a quadrature phase component, a source of second frequency oscillations having an in-phase and a quadrature phase component, means for amplitude modulating each of said in-phase or quadrature phase components with a respective one of said first, second, third or fourth signals, and means for applying all of said modulated components through said delay line to obtain time delayed modulated components, and means for demodulating said time delayed modulated components to provide time delayed first, second, third, and fourth signals.

3. In combination, a source of first signals, second signals and third signals, each having a characteristic modulation, a single time delay circuit, means for simultaneously passing said signals through said single time delay circuit, a source of first frequency oscillations having two components with a fixed, relative phase difference, a source of second frequency oscillations, means for amplitude modulating each of said components with a respective one of said first and second signals to provide amplitude modulated components, means for amplitude modulating said second frequency oscillations with said third signals to provide amplitude modulated oscillations, means for applying said amplitude modulated components and said amplitude modulated oscillations through said single time delay circuit to provide time delayed modulated components and oscillations and means for demodulating said time delayed modulated components and oscillations to provide time delayed first, second and third signals.

4. In combination, a source of first, second, third and fourth signals each having a characteristic modulation, a common time delay circuit responsive to an input signal available at an input terminal for providing said signal at an output terminal with a time delay T, an output circuit, means for simultaneously applying said first, second, third and fourth signals through said time delay circuit to said output circuit comprising a source of first carrier oscillations $f_a$, a source of second carrier oscillations $f_b$, said first and second oscillations each comprising two components with a fixed, relative phase difference, means for amplitude modulating the two components of said first oscillations with a respective one of said first and second signals to provide amplitude modulated components, means for amplitude modulating the two components of said second oscillations with a respective one of said third and fourth signals to provide amplitude modulated components, means for simultaneously applying said amplitude modulated components to said time delay circuit to provide time delayed, amplitude modulated components, means for demodulating said time delayed, amplitude modulated components to provide time delayed first, second, third and fourth signals, and means for applying said last-named signals to said output circuit.

5. In combination, a source of $S_1$, $S_2$, $S_3$, and $S_4$ signals each having a characteristic modulation, a common time delay circuit responsive to an input signal available at an input terminal for providing said signal at an output terminal with a time delay T, an output circuit, means for simultaneously applying said first, second, third and fourth signals through said time delay circuit to said output circuit comprising a source of first carrier oscillations $f_a$, a source of second carrier oscillations $f_b$, means for phase multiplexing said $S_1$ and $S_2$ signals onto said first carrier oscillations $f_a$ to provide a component signal $f_a \pm S_1$ and a component signal $f_a\angle 90^\circ \pm S_2$, means for phase multiplexing said $S_3$ and $S_4$ signals on said second carrier oscillations of frequency $f_b$ to provide a component signal $f_b \pm S_3$ and a component signal $f_b\angle 90^\circ \pm S_4$, means for applying said component signals to said input terminal of said delay circuit to provide signals at said output terminal of $f_a \pm S_1 + T$, $f_a\angle 90^\circ \pm S_2 + T$, $f_b \pm S_3 + T$, and $f_b\angle 90^\circ \pm S_4 + T$, means for phase and frequency demultiplexing said last-named signals to provide signals $S_1 + T$, $S_2 + T$, $S_3 + T$, and $S_4 + T$, and means for applying said last-named signals to said output circuit.

6. In combination, a source of recurrent signals, a source of first oscillations, said oscillations comprising first and second components having a fixed, relative phase difference, means for amplitude modulating said first component with said signals to derive amplitude modulated first components, a time delay circuit, a signal processing circuit, means for applying said amplitude modulated first components through said delay circuit to obtain time delayed amplitude modulated first components, means for applying said amplitude modulated first components through said signal processing circuit to obtain processed modulated first components, means for demodulating said delayed and processed components to obtain delayed and undelayed recurrent signals, means for subtracting said delayed and undelayed recurrent signals to obtain first cancelled signals, means for amplitude modulating said second component with said first cancelled signals to provide amplitude modulated second components, means for applying said amplitude modulated second component through said delay circuit and through said signal processing circuit to obtain time delayed and undelayed amplitude modulated second components, means for demodulating said delayed and undelayed amplitude modulated second components to obtain delayed and undelayed first cancelled signals, means for subtracting said delayed and undelayed first cancelled signals to obtain second cancelled signals, a source of third signals, a source of second oscillations, means for amplitude modulating said second oscillations with said third signals to derive amplitude modulated second oscillations, means for applying said amplitude modulated second oscillations through said delay circuit to obtain delayed amplitude modulated second oscillations, means for demodulating said delayed amplitude modulated second oscillations to obtain demodulated signals, and an output circuit responsive to said second cancelled signal and said demodulated signals.

7. In combination, a source of recurrent signals, a source of first oscillations, said oscillations comprising first and second components having a fixed, relative phase difference, means for amplitude modulating said first component with said signals, a time delay circuit, means for applying a portion of said amplitude modulated first components through said delay line to obtain time delayed amplitude modulated first components, means for demodulating said time delayed components and undelayed amplitude modulated first components to obtain delayed and undelayed recurrent signals, means for subtracting said delayed and underlayed recurrent signals to obtain first cancelled signals, means for amplitude modulating said second component with said first cancelled signals to provide amplitude modulated second components, means for applying said amplitude modulated second component through said delay circuit to obtain time delayed amplitude modulated second components, means for demodulating said time delayed components and undelayed amplitude modulated second component to obtain delayed and undelayed first cancelled signals, means for subtracting said delayed and undelayed first cancelled signals to obtain second cancelled signals, a source of third recurrent signals, means for integrating said third signals comprising a source of second oscillations, means for amplitude modulating said second oscillations with an input signal to derive amplitude modulated second oscillations, means for applying said amplitude modulated second oscillations through said delay circuit to obtain delayed amplitude modulated second oscillations, means for demodulating said delayed amplitude modulated second oscillations to obtain demodulated signals, means for combining a portion of said demodulated signals and said third recurrent signals to provide said input signal, and an output circuit responsive to said second cancelled signal and said integrated signals.

8. In combination, a source of periodic signals, a source of first oscillations, said oscillations comprising in-phase and quadrature phase components, means for amplitude modulating said in-phase component with said periodic signals, a time delay circuit, a wave shaping circuit, means for applying said amplitude modulated in-phase components through said delay circuit to obtain time delayed amplitude modulated in-phase components, means for applying said amplitude modulated in-phase components through said wave shaping circuit to obtain undelayed, shaped, amplitude modulated in-phase components, means for demodulating said last-named delayed and undelayed components to obtain delayed and undelayed periodic signals, means for subtracting said delayed and undelayed periodic signals to obtain first cancelled signals, means for amplitude modulating said quadrature phase components with said first cancelled signals to provide amplitude modulated quadrature phase components, means for applying said amplitude modulated quadrature phase components through said delay circuit and through said wave shaping circuit to obtain time delayed and undelayed, shaped, amplitude modulated quadrature phase components, means for demodulating said last-named delayed and undelayed components to obtain delayed and undelayed first cancelled signals, means for subtracting said delayed and undelayed first cancelled signals to obtain second cancelled signals, a source of third signals, means for integrating said periodic signals comprising a source of second oscillations, means for amplitude modulating said second oscillations with said third signals to derive amplitude modulated second oscillations, means for applying successive ones of said amplitude modulated second oscillations through said delay circuit to obtain delayed amplitude modulated second oscillations, means for demodulating said delayed amplitude modulated second oscillations to obtain demodulated signals, said third signals comprising said periodic signals and a portion of said demodulated signals, and an output circuit responsive to said second cancelled signal and the remaining portion of said demodulated signals.

9. In combination, a source of recurrent signals, a source of first oscillations, said oscillations comprising first and second components having a fixed, relative phase difference, means for amplitude modulating said first components with said signals to provide amplitude modulated first components, a time delay circuit, a coupling circuit, means for applying said amplitude modulated first components through said delay circuit to obtain time delayed amplitude modulated first components, means for applying said amplitude modulated first components through said coupling circuit to obtain coupled amplitude modulated first components, means for demodulating said time delayed and coupled components to obtain time delayed and time undelayed recurrent signals, means for subtracting said last-named delayed and undelayed recurrent signals to obtain first cancelled signals, means for amplitude modulating said second components with said first cancelled signals to provide amplitude modulated second components, means for applying said amplitude modulated second components through said delay circuit and through said coupling circuit to obtain time delayed and coupled amplitude modulated second components respectively, means for demodulating said delayed and coupled amplitude modulated second components to obtain time delayed and time undelayed first cancelled signals, means for subtracting said last-named delayed and undelayed first cancelled signals to obtain second cancelled signals, a source of third signals, a source of second oscillations, means for amplitude modulating said second oscillations with said third signals to derive amplitude modulated second oscillations, means for applying said amplitude modulated second oscillations through said delay circuit to obtain time delayed amplitude modulated second oscillations, means for demodulating said time delayed amplitude modulated second oscillations to obtain demodulated signals, and an output circuit responsive to said second cancelled signals and said demodulated signals.

10. In combination, a source of recurrent signals, a source of first oscillations, a source of second frequency oscillations, said first oscillations comprising first and second components having a fixed relative phase difference, means for amplitude modulating said first components with said recurrent signals to provide amplitude modulated first components, a source of first cancelled signals, means for amplitude modulating said second components with said first cancelled signals to provide amplitude modulated second components, a source of third signals, means for amplitude modulating said second oscillations with said third signals to provide amplitude modulated second oscillations, a common time delay circuit, means for simultaneously applying said amplitude modulated first and second components and said amplitude modulated second oscillations to said time delay circuit to provide time delayed amplitude modulated first and second components and time delayed amplitude modulated second oscillations, means for demodulating said last-named time delayed first components and second components to provide time delayed recurrent signals and time delayed second cancelled signals, said source of first cancelled signals comprising means for subtracting said time delayed recurrent signals and undelayed signals from said source of recurrent signals, means for demodulating said time delayed amplitude modulated second oscillations to provide time delayed third signals, said source of third signals comprising a portion of said last-named time delayed third signals and undelayed signals from said source of recurrent signals, and an output circuit responsive to said second cancelled signals and said integrated signals.

11. In combination, a source of recurrent signals, a source of first frequency oscillations, said oscillations comprising first and second components having a fixed, relative phase difference, means for amplitude modulating said first components with said recurrent signals to provide amplitude modulated first components, a time delay circuit responsive to said amplitude modulated first components for providing time delayed amplitude modulated first components, means for demodulating said time delayed first components to obtain time delayed recurrent signals, means for subtracting said time delayed recurrent signals with undelayed recurrent signals from said source to obtain first cancelled signals, means for amplitude modulating said second components with said first cancelled signals to obtain amplitude modulated second components, said time delay circuit responsive to said amplitude modulated second components for providing time delayed amplitude modulated second components, means for demodulating said time delayed amplitude modulated second components to obtain time delayed first cancelled signals, means for subtracting said time delayed first cancelled signals with undelayed first cancelled signals to provide second cancelled signals, means for integrating undelayed recurrent signals from said source comprising means for circulating said undelayed recurrent signals successively through said delay circuit to provide integrated recurrent signals, and means for utilizing said second cancelled signals and said integrated signals.

References Cited in the file of this patent

UNITED STATES PATENTS

| | | |
|---|---|---|
| 1,447,204 | Espenschied | Mar. 6, 1923 |
| 1,461,064 | Martin | July 10, 1923 |
| 1,608,566 | Potter | Nov. 30, 1926 |
| 1,652,092 | Clement | Dec. 6, 1927 |
| 2,895,009 | Busignies | July 14, 1959 |